United States Patent [19]

Getz et al.

[11] Patent Number: 4,972,134
[45] Date of Patent: Nov. 20, 1990

[54] MOTOR CONTROL CIRCUIT FOR AUTOMATIC WASHER

[75] Inventors: Edward H. Getz, Pipestone Township, Berrien County; Joseph A. Mitchell, Lincoln Township, Berrien County, both of Mich.

[73] Assignee: Whirlpool Corporation, Benton Harbor, Mich.

[21] Appl. No.: 189,069

[22] Filed: May 2, 1988

[51] Int. Cl.$^5$ .............................................. H02P 5/40
[52] U.S. Cl. .................................... 318/817; 68/12 R; 318/754; 318/809
[58] Field of Search ............... 318/816, 817, 415, 416, 318/809, 229, 754; 187/119; 68/12 R

[56] References Cited

U.S. PATENT DOCUMENTS

| | | | |
|---|---|---|---|
| 3,895,278 | 7/1975 | Picunko | 318/421 |
| 3,909,734 | 9/1975 | Palombo et al. | 318/342 |
| 4,319,665 | 3/1982 | Komuro et al. | 187/119 |
| 4,439,718 | 3/1984 | Nola | 318/729 |
| 4,491,197 | 1/1985 | Nishiwaki | 187/119 |
| 4,554,805 | 11/1985 | Hirooka et al. | 68/12 R |
| 4,556,827 | 12/1985 | Erdman | 363/41 |
| 4,741,415 | 3/1988 | Normura | 187/119 |

Primary Examiner—David Smith, Jr.
Attorney, Agent, or Firm—Hill, Van Santen, Steadman & Simpson

[57] ABSTRACT

A motor control circuit for operating a permanent split capacitor motor from an ac source. The motor control circuit causes the motor to accelerate and decelerate according to a velocity profile. A driver circuit connects the motor to the ac source. The driver circuit receives a pulse signal at a predetermined time point after a zero crossing of the ac source and connects the ac line current to the motor at the predetermined time point, then the driver circuit disconnects the ac source from the motor at the next zero crossing of the ac source. A ramp wave signal is generated, each ramp thereof beginning at a zero crossing of the ac source and a dc voltage representative of the speed of the motor is also generated. A velocity profile having a predetermined period is provided on an output of a velocity profile generator. A first comparator circuit has a first input for receiving the dc voltage and a second input for receiving the velocity profile. An error signal is provided on an output thereof. A second comparator has a first input receiving the ramp wave signal and a second input receiving the error signal. An output signal is provided on an output thereof to a monostable circuit which has an input ac coupled to the output of the second comparator and which has an output for providing the pulse signal.

25 Claims, 10 Drawing Sheets

MOTOR CONTROL CIRCUIT FOR AUTOMATIC WASHER

The present invention relates to the following copending application, assigned to the same assignee as the present invention and which is hereby incorporated by reference: Ser. No. 002,674, filed Jan. 12, 1987, now U.S. Pat. No. 4,779,431, issued on Oct. 25, 1988.

BACKGROUND OF THE INVENTION

The present invention relates to an agitator drive system for use in an automatic washer including an alternately reversing drive motor.

In U.S. Pat. No. 4,542,633 an agitating type washing machine is disclosed as having an agitating wheel connected by a pulley arrangement to a reversible drive motor. The agitating wheel is shown as having short, thick blades. A rotational angle detector is connected to a control that causes the motor, which is described as having high rigidity, to rotate the agitating wheel about a predetermined angle. Upon reaching the predetermined angle, the motor is not energized until the agitator wheel has stopped, at which time the motor is operated in a reverse direction to again rotate the agitator wheel about the predetermined angle.

An automatic washer manufactured by an assignee of U.S. Pat. No. 4,542,633, and appearing to incorporate the teachings of that patent, has been observed to have an agitator stroke angle of approximately 360° for each stroke at a rate of 70 strokes per minute. The high rigidity motor causes a nearly constant agitator speed in each rotational direction following a brief, rapid acceleration, and followed by the coasting to stop action.

Thus, automatic washer drive systems having reversing motors for producing a generally square wave agitation curve are known. An agitation curve is defined herein as the rotational speed of the agitator over time. A square wave agitation curve is, thus, a constant speed in one direction followed by a constant speed in the opposite rotational direction. Correspondingly, a sinusoidal agitation curve would result from gradual acceleration followed immediately by a gradual deceleration of the agitator in, each rotational direction.

In U.S. Pat. No. 3,315,500 to Brundage et al., a mechanism is provided as a drive system for an agitator using a motor operating at a constant speed in one direction to drive a hydraulic transmission which provides very rapid reversal of the agitator through a reversing valve and, thus, is a square wave type agitation motor. An elastic coupling is used between the agitator and the agitator drive shaft to reduce the shock which would otherwise be delivered to the agitator at each reversal. The patent teaches that square wave type agitation motion is preferred because more energy is imparted to the wash load.

An automatic washer having an axial air gap induction motor is disclosed in U.S. Pat. No. 4,232,536. The motor is repeatedly reversed to oscillate a vertical axis agitator through a planetary drive coupled therebetween, the motor being operated at high speeds. The desirability of providing a soft starting action of the agitator each time it reverses is recognized, the soft starting action being provided by the backlash associated with the planetary drive mechanism. No mention is made of the resultant agitator action.

U.S. Pat. No. 4,555,919 discloses a flexible vane agitator for use in a high stroke rate washer. The agitator exhibits a high degree of coupling to a wash load.

The prior art as exemplified by the above-identified patents provide only limited control for accelerating and decelerating a motor during the agitate cycle in an automatic washer. The present invention overcomes this drawback in the prior art by providing variable control of the motor through each direction of rotation of the agitator in the automatic washer.

SUMMARY OF THE INVENTION

The present invention is a motor control circuit for operating a permanent split capacitor motor from an ac source. In general, the motor control circuit causes the motor to accelerate and decelerate according to a velocity profile curve. A driver circuit connects the motor to the ac source. The driver circuit receives a pulse signal at a predetermined time point after a zero crossing of the ac source and connects the ac source to the motor at the predetermined time point, then the driver circuit disconnects the ac source from the motor at the next zero crossing of current through the motor. A sensing circuit is connected to the driver circuit for sensing voltage of the ac source and outputting a sense square wave synchronized to the ac source. A zero crossing ramp generator is connected to the sensing circuit for converting the sense square wave to a ramp wave signal, each ramp thereof beginning at a zero crossing of the ac source.

A tachometer is connected to the motor for outputting a tach square wave. A tach pulse generator is connected to a tachometer output of the tachometer for converting the tach square wave into a series of tach pulses. A pulse to voltage converter is connected to the tach pulse generator for converting the series of tach pulses to a dc voltage.

In a preferred embodiment of the present invention, a velocity profile generator has a rate circuit having a first output for providing a square wave having a predetermined period greater than a period of the ac line current and a second output for providing a triangular wave having the predetermined period. An amplitude clipper circuit is connected to the second output of the rate circuit, and a dc offset circuit is connected to an output of the clipper circuit. A velocity profile signal having the predetermined period is therefore provided on an output of the dc offset circuit.

A first comparator circuit has a first input for receiving the dc voltage and a second input for receiving the velocity profile signal. An error signal is provided on an output thereof. A second comparator has a first input receiving the ramp wave signal and a second input receiving the error signal. An output signal is provided on an output thereof. A monostable circuit has an input ac coupled to the output of the second comparator and has an output for providing the pulse signal having a predetermined width to the driver circuit.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

The present invention has general applicability, but is most advantageously utilized in an automatic washing machine.

Figure 1:
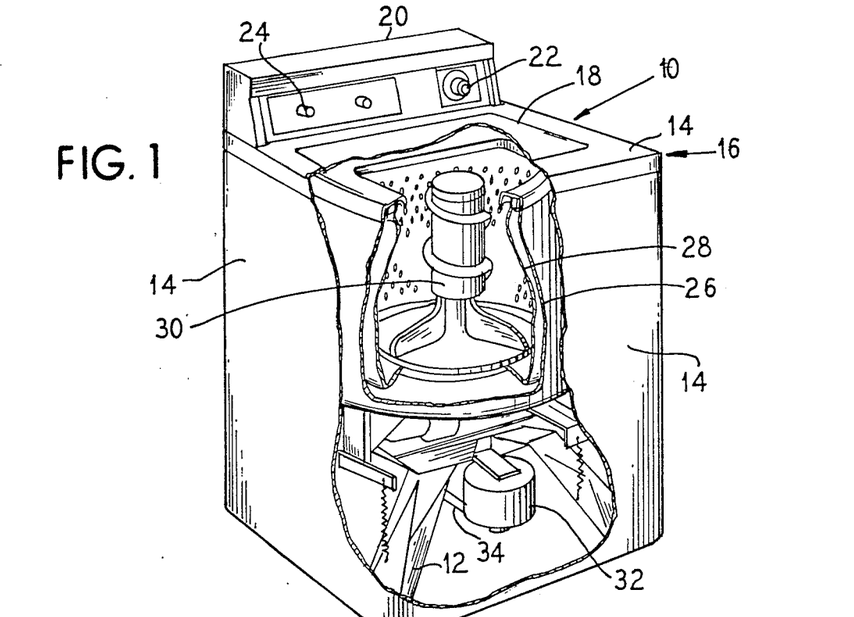
FIG. 1 is a perspective view partially cut away depicting a washing machine utilizing the present invention.

In FIG. 1, reference numeral 10 indicates generally a vertical axis agitator type washing machine having presettable controls for automatically operating the machine through a programmed series of washing, rinsing, and spinning cycles. The machine includes a frame 12, carrying panels 14 forming the sides, top, front, and back of a cabinet 16. A hinged lid 18 is provided in the usual manner for access to the interior of the washing machine 10. The washing machine 10 has a rear console 20 in which is disposed manually settable control means, including a timer dial 22 and a temperature selector 24.

Internally of the washing machine 10 there is disposed an imperforate fluid containing tub 26 within which is rotatably mounted a perforate basket 28 for rotation about a vertical axis. A vertically disposed agitator 30 is connected for operation to a motor 32 through a drive mechanism 34.

Figure 2:
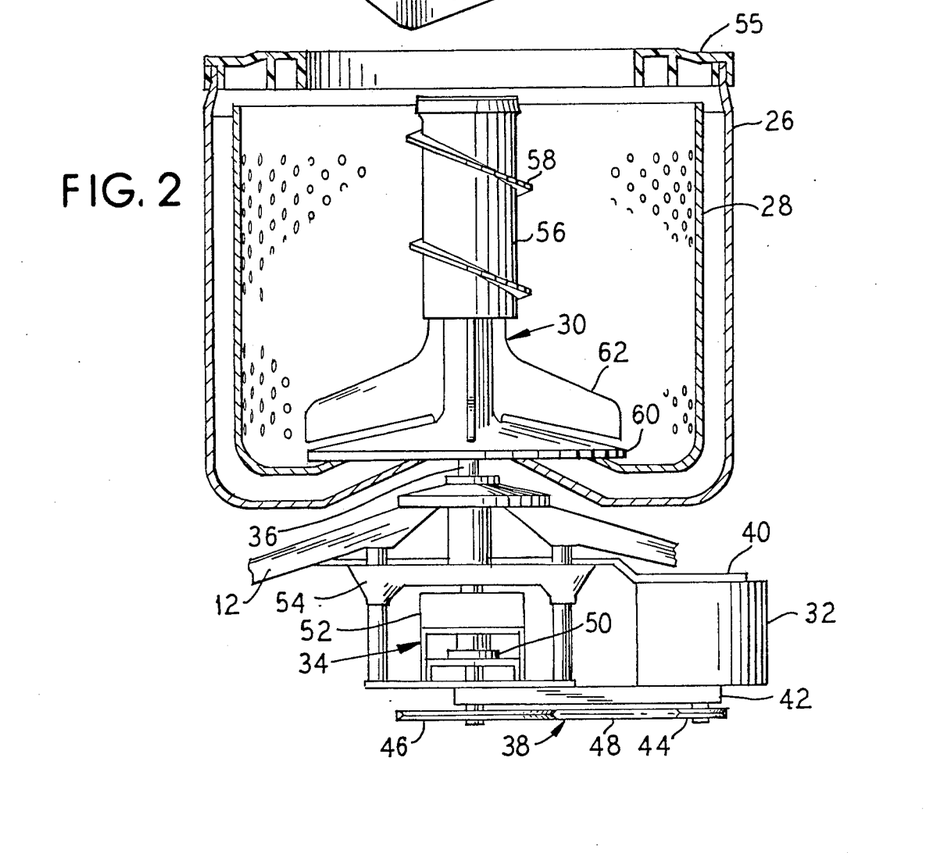
FIG. 2 is a cross-sectional view of a portion of the FIG. 1 washing machine.

Referring to FIG. 2, the agitator 30 is linked by a shaft 36 to the reduction drive 34, which in turn is driven through a pulley arrangement 38 by the motor 32. The motor 32 is a high slippage motor and preferably a permanent split capacitor (PSC) motor which has a low start torque relative to its breakdown torque to provide a soft start of the agitator. The PSC motor 32 also has a relatively flat load curve above a breakdown point so that steady state speed will not vary greatly with load. The motor 32 is mounted in a bracket arrangement 40 and 42 which connects to the frame 12 of the washer 10.

The motor 32 is linked by the pulley arrangement 38, including a drive pulley 44 and a driven pulley 46 connected by a belt 48, to the reduction drive 34. The reduction drive 23, in one embodiment, is a planetary gear drive which includes a spring clutch 50 and a planetary housing 52 mounted in a reduction drive frame 54 that connects to the frame 12. Although a planetary reduction drive is disclosed herein for use with the present invention, it is also contemplated that a variety of other reduction drive arrangements could be utilized as is known to those skilled in the art. It is also contemplated to eliminate the reduction drive and link the agitator directly to an appropriately selected motor.

The shaft 36 extends upwardly from the reduction drive 34 through the tub 26 and the perforate basket 28 and connects to the agitator 30. A tub ring 55 extends around the top of tub 26. The agitator 30 is a dual action agitator having an upper barrel 56 with helical vanes 58, as well as a lower agitator portion 60 from which extends a plurality of flexible vanes 62. The flexible vanes 62 enable the agitator 30 to absorb energy as the direction of rotation is reversed, while still coupling the agitator 30 to the load provided by water within the tub 26, as well as any articles of clothing therein. This coupling between the agitator and the clothes and water loads the motor to cause the speed to increase slowly. The flexible vanes provide a more uniform load coupling and torque over the angular range of the stroke over a range of clothes load sizes. The flexibility of the vanes 62 also prevents the impact loading at the beginning or the stroke from exceeding the locked rotor torque of the motor 32.

Figure 3:
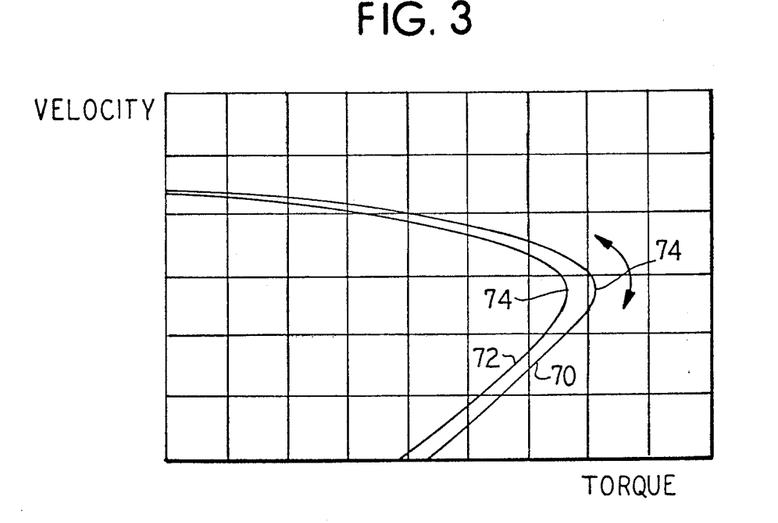
FIG. 3 is a graph of a torque vs. speed diagram for a permanent split capacitor motor used in the FIG. 1 washing machine.

The torque/speed characteristics of the PSC motor 32 are shown in FIG. 3. The torque/speed curve is plotted at 70 for a first direction of operation and the curve 72 shows the torque/speed characteristic in an opposite direction. As discussed above the motor 32 has a low torque at slow speeds, and a relatively flat curve above a breakover or breakdown point 74 which is indicated by the rightmost portion of the curve having the highest torque value. It can be seen that the PSC motor 32 is operating primarily on the start-up portion of the torque/speed curve.

Figure 4:
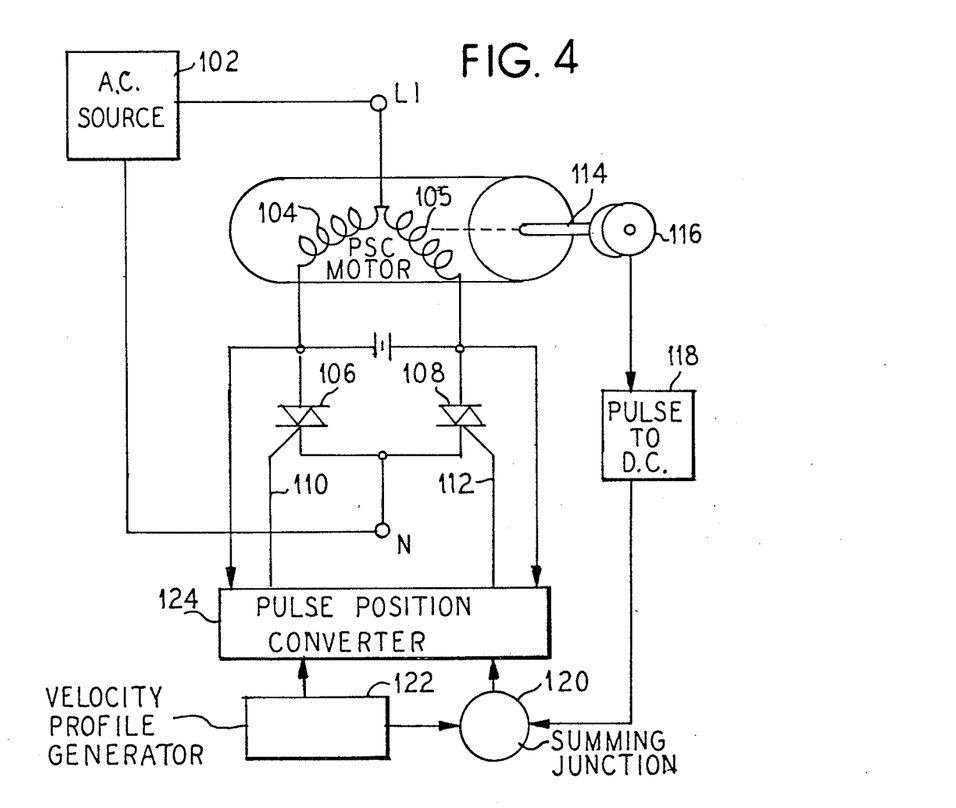
FIG. 4 is a general block diagram of a control circuit for use with the permanent split capacitor motor.

Referring now to FIG. 4, a permanent split capacitor motor 32 is connected to an alternating power source 102 which supplies ac voltage and current at the proper frequency and amplitude for operating the motor 32. The motor 32 includes a pair of Windings 104 and 105. These windings 104 and 105 are connected such that one winding is a run winding and the other is an auxiliary winding. A pair of switches 106 and 108 determine which of the windings 104 and 105 are to be the run and auxiliary windings. By way of example, the switches 106 and 108 may be triacs as shown in FIG. 4, the triacs 106 and 108 having control electrodes 110 and 112, respectively.

Other types of bidirectional switch means may be used in place of the triacs 106 and 108, as for instance mechanical switches or relays. However, the use of triacs allows relatively precise control at the point at which the windings are energized.

Using the motor and switching arrangement of FIG. 4 a rapid reversal of the motor 32 may be affected by energizing the windings 104 and 105. However, superior performance of the washing machine can be attained by energizing the PSC motor 32 according to a velocity profile, that is, for example, accelerating a motor for a predetermined length of time, running the motor at a constant rate and then finally decelerating the motor until it reaches a zero velocity, at which time the motor 32 is reversed by changing the switches 106 and 108. The velocity profile used to operate the motor in each direction as applied to each of the windings 104 and 106 can take any of a variety of shapes depending upon the application.

As shown in FIG. 4, a shaft 114 of the motor 32 is connected to a tachometer 116 which outputs a signal indicative of the speed of the motor 32. A pulse to dc circuit 118 converts this signal to a dc level which is applied to a summing junction 120. Also supplied to the summing junction 120 is the velocity profile signal from the velocity profile generator 122. The velocity profile generator 122 also supplies a direction signal which is utilized by the pulse position converter 124. The pulse position converter 124 also receives an error signal from the summing junction 120 and then based on this information, the motor 32 applies a pulse signal to the appropriate triac during at a certain phase angle of the ac current supplied from the ac power source 102 to determine the amount of power applied to the motor 32. As is well known, the triac, after having been gated on, will remain on until the next zero crossing of the ac current through the motor 32.

Figure 5:
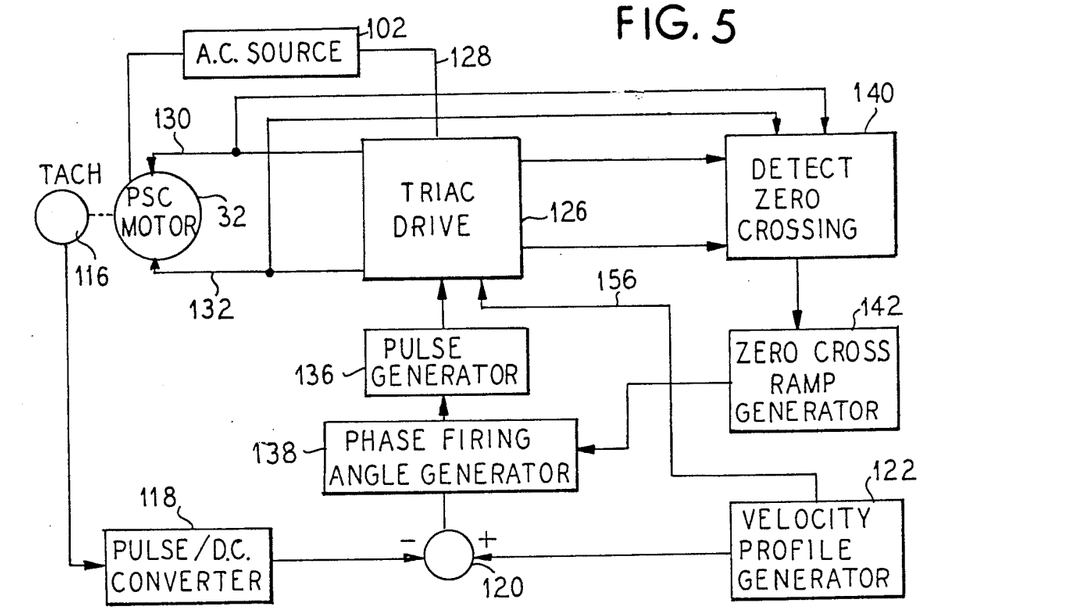
FIG. 5 is a detailed block diagram of the control circuit.

FIG. 5 shows a general block diagram of a preferred circuit for controlling the permanent split capacitor motor 32. The PSC motor 32 is energized from the ac source 102 and the PSC motor 32 has the tachometer 116 connected to it as previously described. The reversing triac drive 126 connects the ac source line 128 to either line 130 or 132 depending upon the direction of rotation selected for the PSC motor 32. The triac drive 126 receives a direction signal for selecting line 130 or 132 from the velocity profile generator 122. The triac drive circuit 126 also receives a pulse signal for determining the phase firing angle of each of the triacs contained in the triac drive circuit 126 from the pulse generator 136. A dc level provided from the pulse to dc converter 118, representative of the speed of the PSC motor 32 is compared at summing junction 120 to the velocity profile signal provided by the velocity profile generator 122. The resulting error signal is provided to a phase firing angle generator 138 which also receives a ramp signal to provide an appropriate output signal to the pulse generator 136. Lines 130 and 132 are also connected to a zero crossing detector 140 which receives the ac current flowing in lines 130 or 132 on its two inputs. The signals are processed to provide a square wave having a zero crossing at the corresponding zero crossing points of the ac current flowing in the PSC motor 32. This square wave signal is provided to the zero crossing ramp generator 142 which converts this signal t o the ramp signal wherein each ramp thereof begins at the zero crossing at the ac current. The zero crossing detector 140, the zero crossing ramp generator 142, the phase firing angle generator 138 and the pulse generator 136 form the pulse position converter 124 depicted in FIG. 4.

Figure 6A:
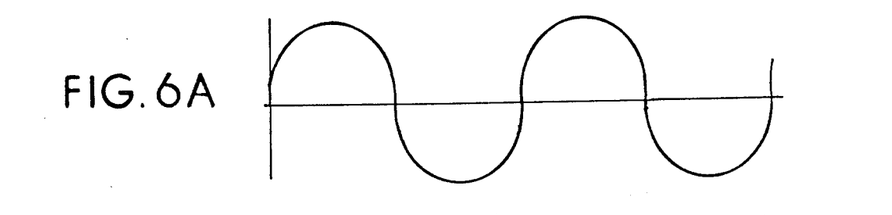
FIGS. 6A through 6D depict graphs of various waveforms in the FIG. 5 block diagram.
Figure 6B:
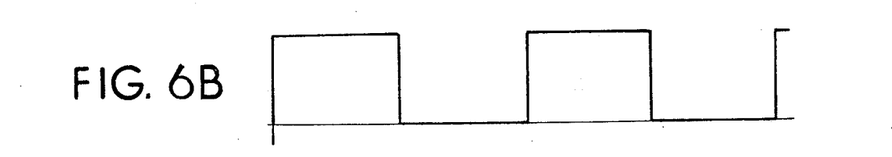
Figure 6C:
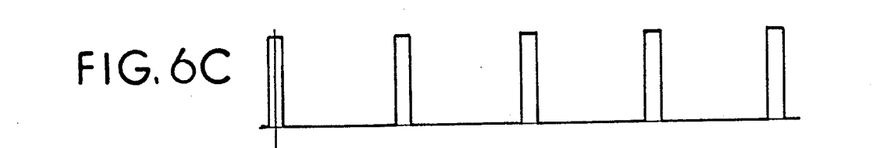

These waveforms are depicted in FIGS. 6A through 6D FIG. 6A shows the ac line current which is flowing in either lines 130 or 132 depending upon the selected direction of rotation of the PSC motor 32. FIG. 6B depicts the output of the zero crossing detector 140 which is a square wave which changes level at a point in time corresponding to the zero crossing of the ac current. As will be explained below, within the zero crossing ramp generator 142 a series of pulses shown in FIG. 6C is provided which correspond in time to the change in level of the square wave signal shown in FIG. 6B. The output of the zero crossing ramp generator 142 is the ramp wave signal depicted in FIG. 6D wherein each ramp thereof begins at the corresponding zero crossing point of the ac current.

Figure 7:
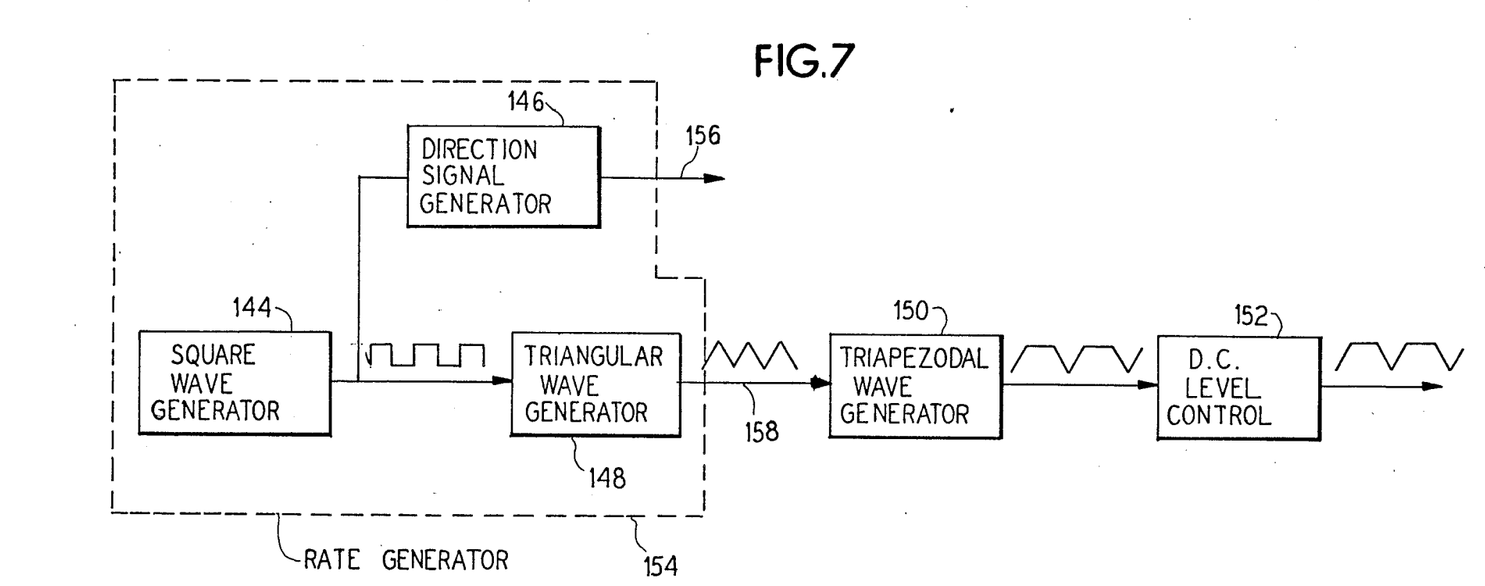
FIG. 7 is a more detailed block diagram of a velocity profile generator shown in FIG. 5.
Figure 8A:
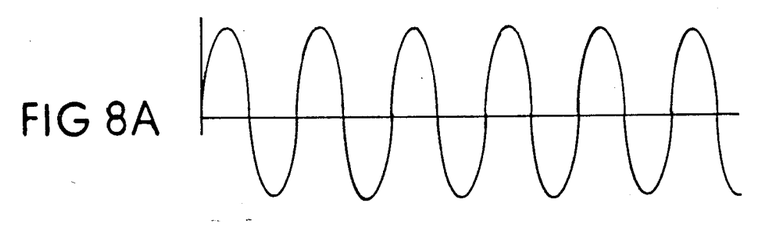
FIGS. 8A through 8E are graphs illustrating various waveforms in the FIG. 7 block diagram.
Figure 8B:
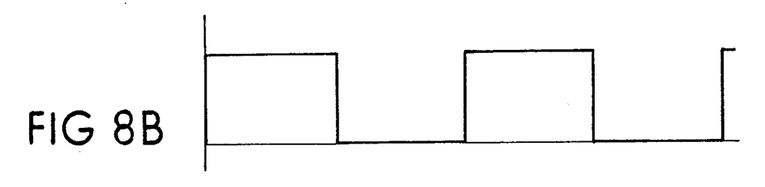

The more detailed block diagram of the velocity profile generator 122 is illustrated in FIG. 7 and the corresponding waveforms are shown in FIGS. 8A through 8E. It is to be understood that the velocity profile may have any shape which is suitable for a selected application. The following is just one example of a circuit for generating the velocity profile depicted in FIG. 8E. A square wave generator 144 generates a square wave as shown in FIG. 8B having a predetermined period, wherein this period is greater than the period of the ac current as shown in FIG. 8A. The output of the square wave generator 144 is provided to a direction signal generator 146 which outputs a direction signal on line 156 to the reversing triac drive circuit 126 (see FIG. 5). This direction signal is utilized to switch the ac current between lines 130 and 132, thereby causing the PSC motor 32 to change direction of rotation.

Figure 8C:
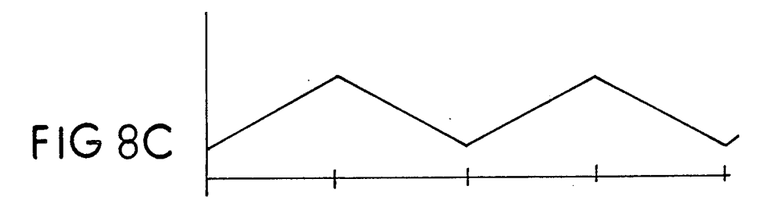
Figure 8D:
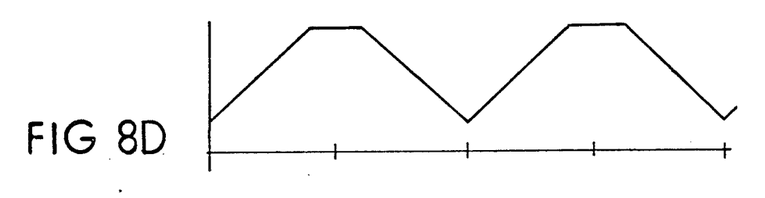
Figure 8E:
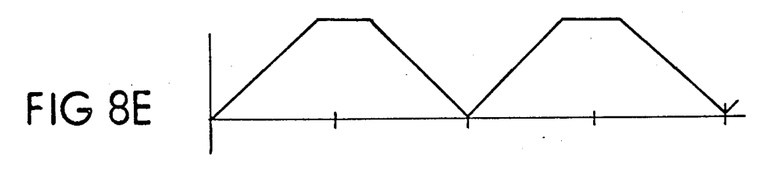

The output of the square wave generator 144 is also provided to a triangular wave generator 148 which outputs a triangular wave shape depicted in FIG. 8C. A trapezoidal generator 150 essentially clips the peaks of the triangular wave and results in the waveform shown in FIG. 8D. This waveform is then processed by a dc offset and level control 152 which provides the final velocity profile signal depicted in FIG. 8E wherein between each period of the velocity profile signal the signal reaches a zero level. It should be noted that the velocity profile signal has the same period as the period of the square wave provided by square wave generator 144.

Referring to FIG. 7 it may be seen that the square wave generator 144, the direction signal generator 146 and the triangular wave generator 148 may be referred to collectively as a rate generator 154 having the output line 156 upon which the direction signal appears and having an output 158 upon which the triangular wave signal appears.

Figure 9A:
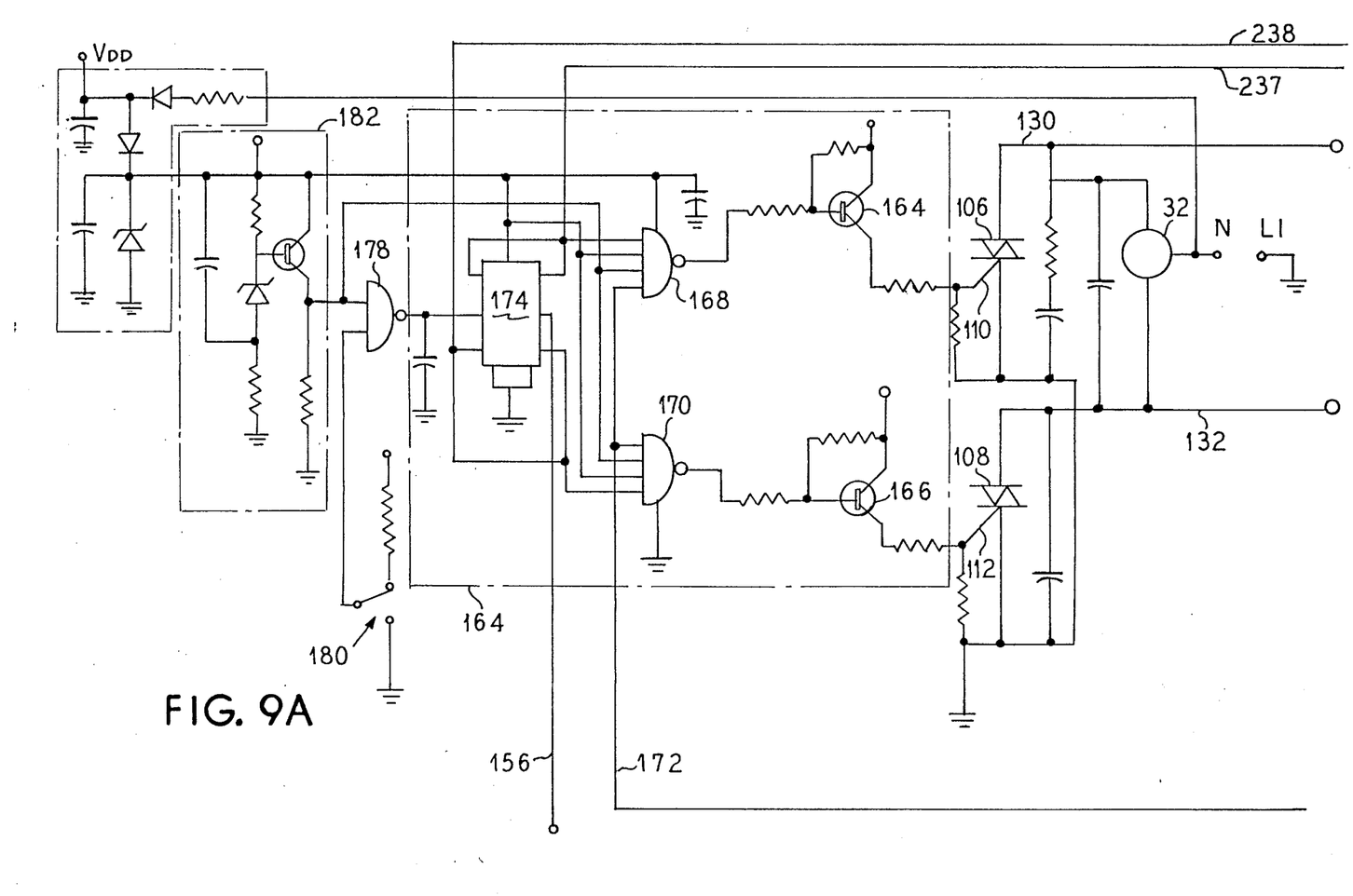
FIGS. 9A through 9D are circuit diagrams of different portions of the FIG. 5 block diagram.

FIG. 9A is a circuit schematic of the reversing triac drive circuit 126. Triacs 106 and 108 respectively and alternately connect the ac current along lines 130 and 132 to the PSC motor 32. The gates 110 and 112 of the triacs 106 and 108 receive pulses to turn the respective triac on which remains on until the next zero crossing of the ac current flowing in either line 130 or 132. The triacs 106 and 108 receive their pulse signals from transistor drivers 164 and 166 respectively. These transistor drivers have their bases connected to the outputs of OR-gates 168 and 170, respectively. The inputs to the gates 168 and 170 have a first input which receives the pulse signal on input 172 and second inputs connected to two outputs of the flip-flop 174. Thus, the pulse signal on input 172 which is connected to the first inputs of both gates 168 and 170 is applied to one of the transistor drivers 164 and 166 depending upon the output state of the flip-flop 174. The flip-flop 174 thereby determine the direction of rotation of the PSC motor 32 by selecting one of the gates 168 or 170. The flip-flop 174 is controlled by the direction signal received on input line 156 to the reversing triac drive circuit 126.

Gate 178 is provided to disable the flip-flop 174 when the switch 180 is changed from an agitate position to a spin position and during power up from the power up circuit 182.

Figure 9B:
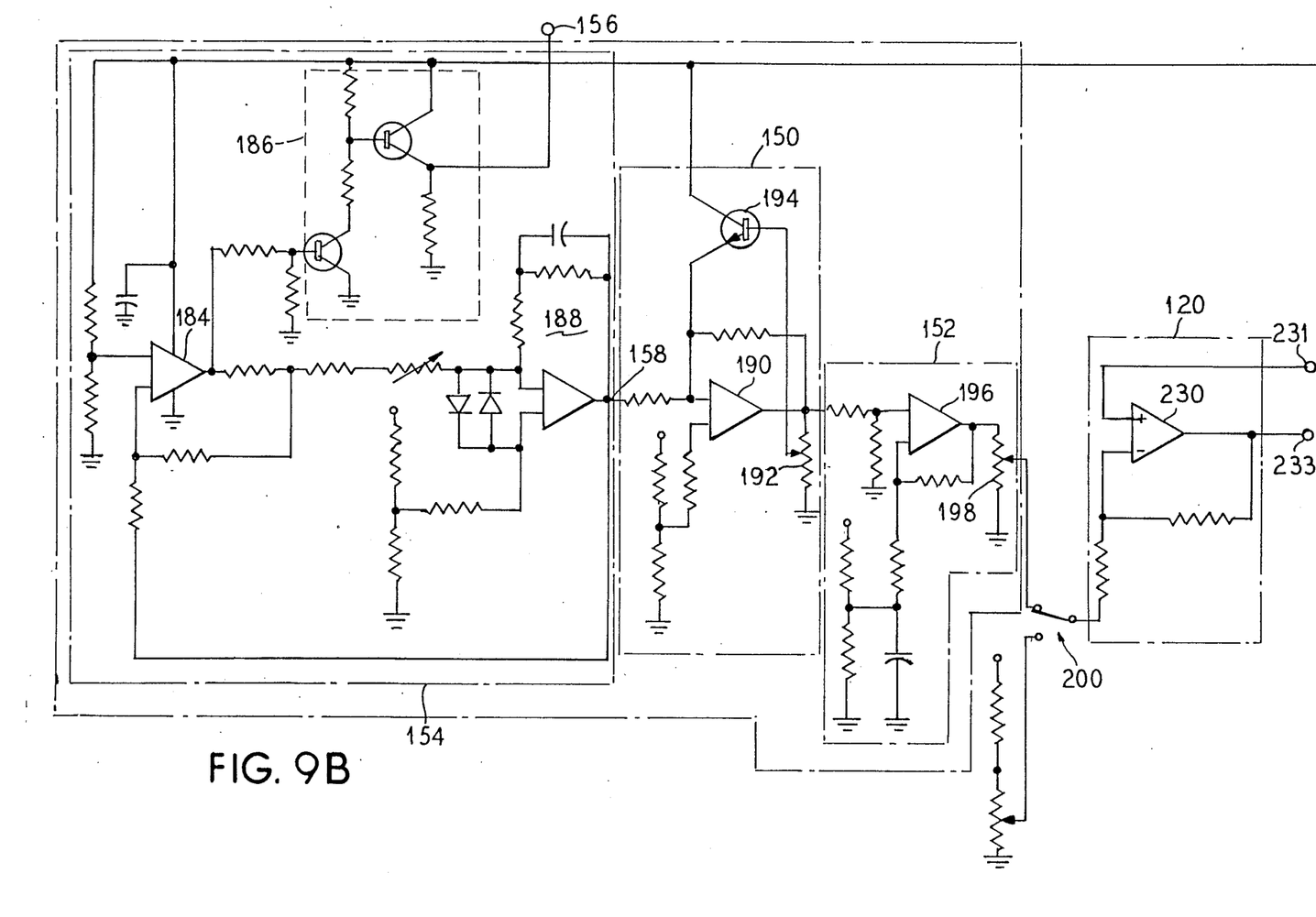

Referring now to FIG. 9B, a circuit schematic of the velocity profile generator 122 is illustrated, including a square wave generator 144, direction signal generator 146, triangle wave generator 148, trapezoidal wave generator 150 and dc level control 152, described previously with reference to FIG. 5. Transistor circuit 186 is the direction signal generator 146. The square wave generator 144 includes a comparator 184, the negative input to comparator 184 being a reference voltage. The positive input of the comparator 184 is a feedback signal of the output of the triangle wave generator 148. The output of comparator 184 is a square wave signal. The square wave signal is fed to the direction signal generator 146 which outputs the direction signal on line 156 to change the state of the flip-flop 174 of the reversing triac drive 126 (FIG. 9A). The triangle wave generator 148 includes an integrator circuit 188 which receives the square wave from the comparator 184 and outputs a triangular wave on line 158.

The trapezoidal wave generator 150 consists of a clipper circuit. The triangular wave is supplied to the negative input of a comparator 190 which has a reference voltage on its positive input. A potentiometer 192 and a transistor 194 provide an adjustment for the amount of clipping of the peaks of the triangular wave supplied to the negative input of comparator 190 as is well known in the art.

The dc offset of the resulting trapezoidal signal from the trapezoidal wave generator 150 is adjusted with the dc offset and level control 152. The trapezoidal signal is supplied to the positive input of a comparator 196. The negative input of comparator 196 is a reference voltage. A potentiometer 198 adjusts the overall amplitude of the velocity control profile signal. A switch 200 selectively connects the output of the velocity profile generator 122 to the summing junction 120 for the agitate function and disconnects the velocity profile generator 122 for the spin function.

Figure 9C:
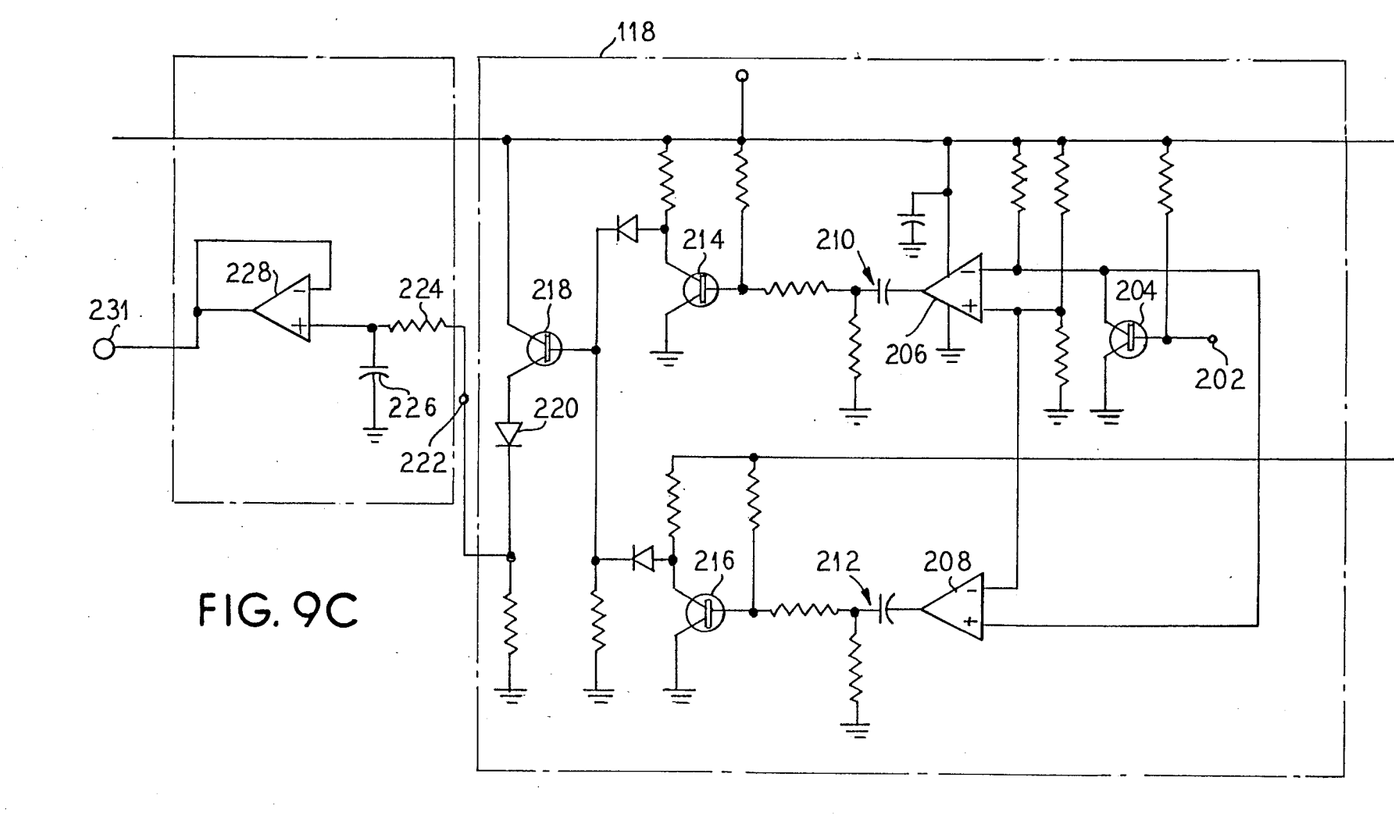

Referring now to FIG. 9C illustrating the circuit schematic of the pulse to dc circuit 118, the signal from the tachometer 116 (FIGS. 4 and 5) is received on input 202 which is connected to the base of transistor 204. The output of the transistor 204 is connected to the negative input of amplifier 206 and the positive input of amplifier 208, thereby providing alternate signals on their outputs. These signals are out of phase with one another. On the output of each of the amplifiers 206 and 208 are differentiator circuits 210 and 212, respectively. The differentiator circuits 210 and 212 are coupled through transistor 214 and 216, respectively, and the signals at the output of these transistors 214 and 216 are combined on the base of transistor 218. Thus this circuit operates as an OR-gate and in a sense is a zero crossing detector except that the pulse that occurs is a constant width pulse and is calibrated based on the frequency that is going to be received at the tachometer input 202.

The output of transistor 218 coupled through diode 220 appears on the output 222 of the pulse to dc circuit 118 and is a series of pulses. This series of pulses is converted to a dc voltage by sending the series of pulses through a filter composed of resistor 224 and capacitor 226 to the input of amplifier 228. The output 231 of amplifier 228 is a dc voltage level indicative of the speed of the PSC motor 32. This dc voltage is supplied to the positive input of comparator 230 in the summing junction 120, (see FIG. 9B.) the velocity profile signal being supplied to the negative input of the comparator 230. The output 233 of comparator 230 is an error signal representative of the difference between the dc voltage representative of the PSC motor 32 and the desired level of the velocity profile.

Figure 9D:
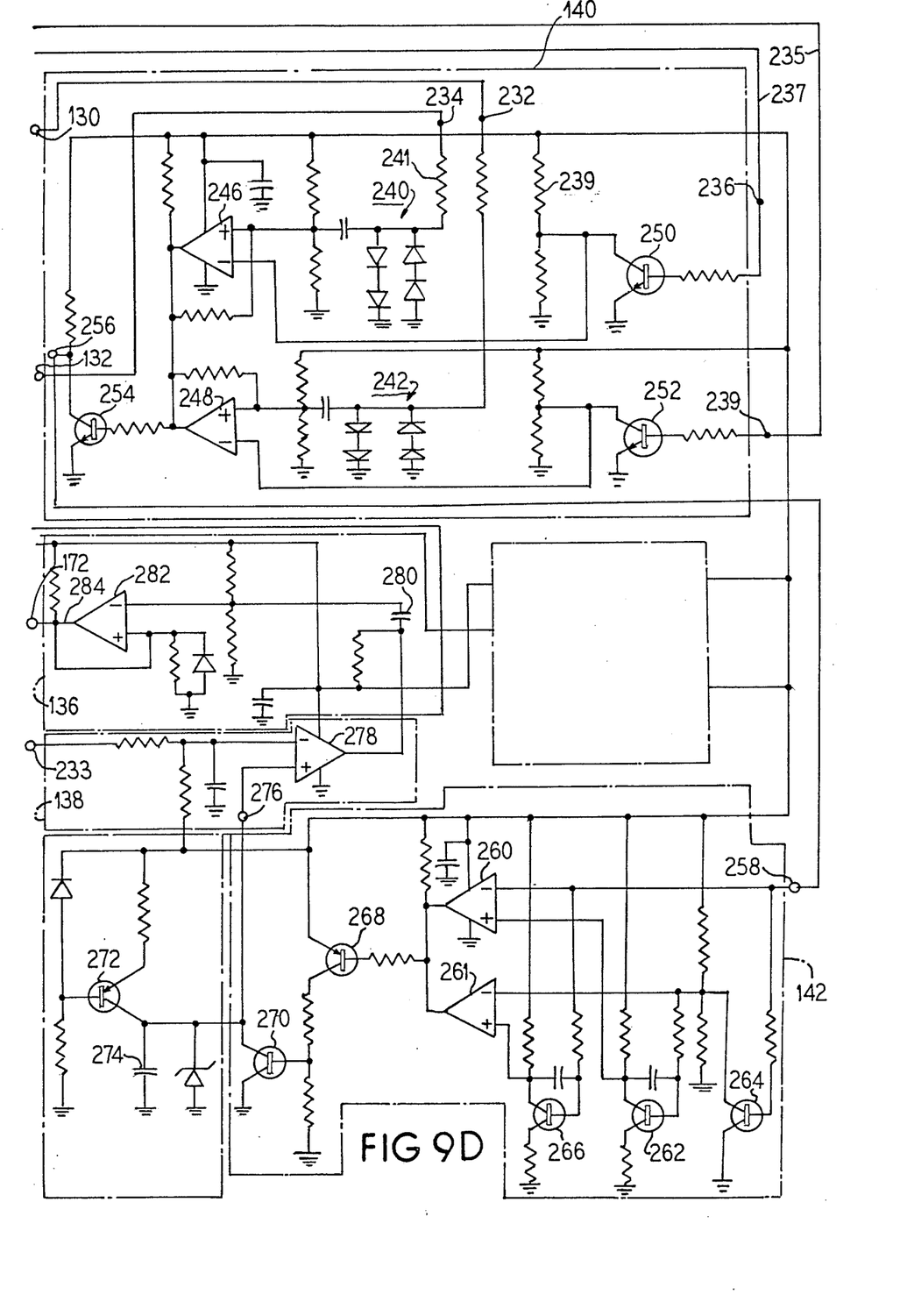

FIG. 9D is a schematic diagram of the pulse position converter 124 (see FIG. 4), which includes the pulse generator 136, the phase firing angle generator 138, the zero crossing detector 140 and the zero crossing ramp generator 142 as previously cited with reference to FIG. 5. The zero crossing detector 140 has inputs 232 and 234 connected to lines 130 and 132, respectively. The zero crossing detector 140 also has two inputs 236 and 238 connected to the two outputs 237 and 238, respectively, of the flip-flop 174 in the driver circuit 126 (se FIG. 9A). The inputs 232 and 234 are connected through resistor 239 and 241, respectively, to diode clipping circuits 240 and 242, respectively. The resistors 239 and 241 limit the current flow and the diodes contained in the diode clipping circuits 240 and 242 limit the amplitude of the waveform. The signal across the diodes is present whether or not the triacs 106 and 108 are in an on or off state. The signal across the diodes in the clipping circuits 240 and 242 go through a zero crossing corresponding to the zero crossing of the ac current in the PSC motor 32. The resulting waveform is fed to level comparators or Schmidt triggers 246 and 248 the output of which is a square wave.

The transistors 250 and 252 receive on their bases the signals from inputs 236 and 238, respectively, from the flip-flop 174. Thus the transistors 250 and 252 are alternately turned on depending upon the setting of the flip-flop 174. The outputs of the transistors 250 and 252 are also connected to the level comparators 246 and 248, respectively, to alternately disable these devices. The output signal of the amplifiers 246 and 248 is a square wave which is applied to the base of transistor 254 the output of which (see FIG. 6B) is the output 256 of the zero crossing detector 140. This square wave has transitions corresponding to the zero crossing of the ac current in the PSC motor 32.

The output 256 of the zero crossing detector 140 is connected to input 258 of the zero crossing ramp generator 142. The square wave appearing at the input 258 is supplied to the negative input of comparator 260, the positive input thereof being supplied from the transistor 262 which has its base connected to the output of transistor 264 which in turn has its base receiving the square wave from input 258. The output of transistor 264 is also connected to the negative input of comparator 261. The positive input of comparator 261 is connected to the output of transistor 266 whose base is also connected to the square wave received on the input 258. The outputs of the comparators 260 and 261 are connected together and are also connected to the base of transistor 268. The output of transistor 268 controls the base of transistor 270.

Transistor 272 causes capacitor 274 to charge over a predetermined time period. Since the output 276 of transistor 270 is connected across the capacitor 274, when the transistor 270 conducts, the capacitor 274 is discharged. When the transistor 270 is nonconducting the capacitor 274 begins to charge from transistor 272. The signal appearing on the base of transistor 270 is a series of pulses (see FIG. 6C) which are synchronized with the transitions of the square wave inputted on input 258 which in turn is synchronized to the zero crossing of the ac current. Therefore, the output 276 of the transistor 270 is a ramp wave signal which begins at each zero crossing of the ac current. That is, at each zero crossing of the ac current the transistor 270 conducts momentarily and discharges the capacitor 274 which then begins charging again until the next pulse arrives on the base of transistor 270. This ramp signal is shown in FIG. 6D.

Figure 6D:
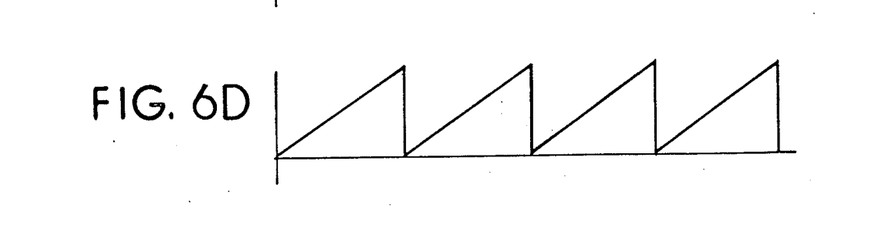

The ramp signal depicted in FIG. 6D and the dc error signal from the output 233 of the summing junction 120 (see FIGS. 5 and 9B) are input to the positive and negative inputs, respectively, of comparator 278 in the phase firing angle generator 138. The signal appearing on the negative input of comparator 278 is a dc error signal representative of the difference between the actual and the desired speed of the PSC motor 32. At some point in time, the dc level of the ramp signal appearing on the positive input of the comparator 278 will exceed the dc level appearing on the negative input of the comparator 278. At that point in time, the comparator 278 has a transition signal appearing on its output. The output of comparator 278 is ac coupled through capacitor 280 to the pulse generator 136 and, more particularly to the negative input of monostable circuit 282. The output 284 of the monostable circuit 282, providing a pulse signal having a predetermined width, is connected to the input 172 of the driver circuit 126 (see FIG. 9A).

Figure 10A:
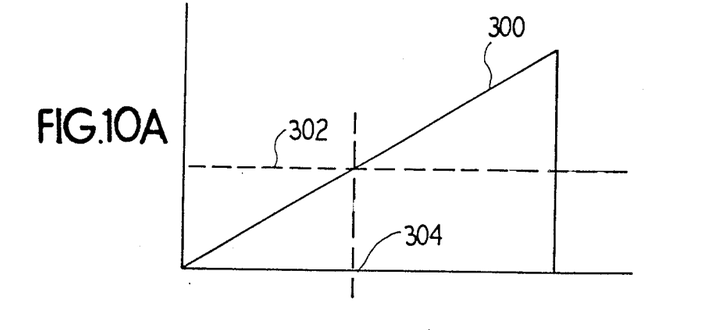
FIGS. 10A through 10D are graphs depicting waveforms illustrating the operation of the circuits shown in FIGS. 9A through 9D.
Figure 10B:
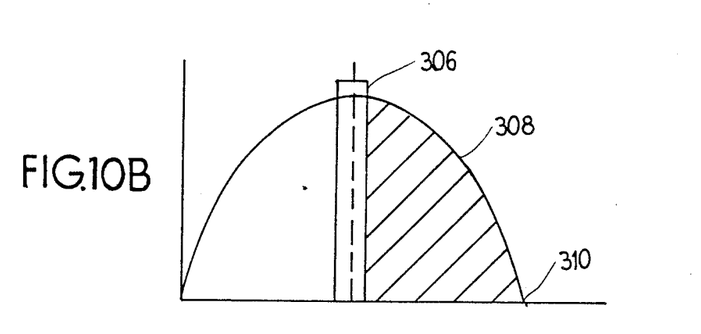

As shown schematically in FIG. 10A the ramp signal 300 intersects the dc error signal level 302 at time point 304. As shown in FIG. 10B this produces the pulse signal 306 from the pulse generator 136. After t he pulse signal 306 and for the remainder of the ac current half cycle, depicted as 308, the motor 32 will be supplied with the ac current. Thus, at time 304 the drive circuit 126 will turn on one of the triacs 106 or 108. The selected triac will stay on until t he time 310 where the ac signal crosses the zero level.

Figure 10C:
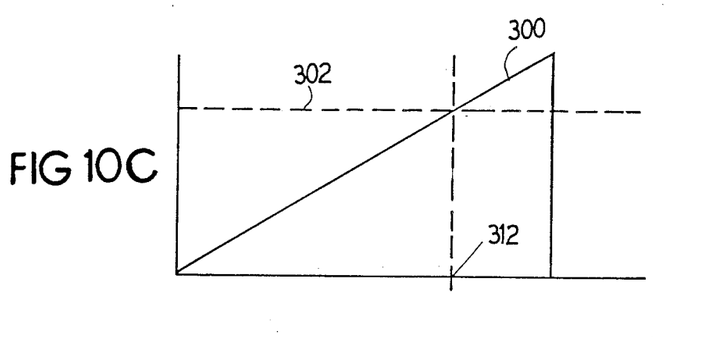
Figure 10D:
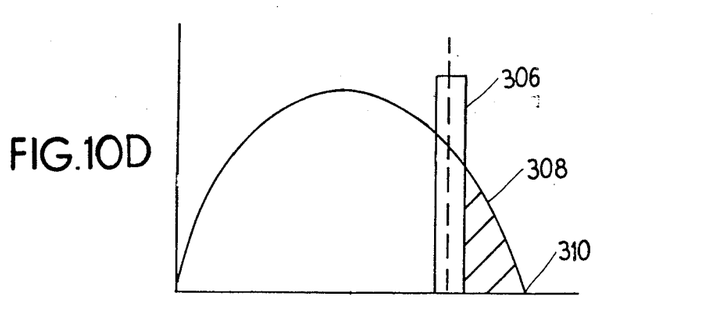

It is also contemplated as shown in FIG. 10C that for a dc error voltage of less value than that shown in FIG. 10A, the point in time 312, for beginning to supply power to the motor 32, occurs later than the point in time 304, since the ramp signal 300 crosses the error voltage line 302 at a later time. This again produces the pulse 306 at point in time 312 turning on the triac which remains on until the ac half wave signal 308 crosses the zero level at point in time 310, as shown in FIG. 10D. Thus it can be seen that less power is being supplied to the motor 100 in FIG. 10D than in FIG. 10B. Therefore, as the dc error voltage increases, the power supplied to the motor decreases, until no power is required when the dc error voltage exceeds or equals the maximum.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

The embodiments of the invention in which an exclusive property or privilege is claimed are defined as follows:

1. A motor control circuit for operating a permanent split capacitor motor from an ac source, comprising:
    means for driving said motor from the ac source, said means for driving receiving a pulse signal at a predetermined time after a zero crossing of the voltage of the ac source, said means for driving connecting the ac source to said motor at said predetermined time and then disconnecting the ac source from said motor at a next zero crossing of ac current in said motor;
    first means for providing a first signal indicative of the speed of said motor;
    means for generating a velocity profile having means for generating a square wave signal and means for converting said square wave signal to said velocity profile;
    means for providing said pulse signal receiving said first signal and said velocity profile signal to produce said pulse signal therefrom;
    means for generating said square wave signal having a predetermined time period;
    means for generating a triangular wave signal from said square wave signal;
    means for clipping said triangular wave signal to produce a trapezoid wave signal; and
    means for adjusting a dc offset of said trapezoidal signal to produce aid velocity profile signal having said predetermined time period.

2. The motor control circuit according to claim 1, wherein said predetermined time period of said square wave is substantially longer than a time period of the ac source.

3. The motor control circuit according to claim 2, wherein said means for providing said pulse signal produces a pulse signal every half cycle of the ac source.

4. The motor control circuit according to claim 2, wherein said velocity profile has a predetermined time period and said means for driving is reversible to drive said motor in one direction during a first time period of said velocity profile and in an opposite direction during a next second time period of said velocity profile, said means for driving receiving a direction signal for reversing said motor from said means for generating a velocity profile.

5. The motor control circuit according to claim 4, wherein said velocity profile has value of substantially zero at a time point between said first and second time periods of said velocity profile so that said motor is substantially stopped when the means for driving receives said direction signal for reversing said motor.

6. The motor control circuit according to claim 5, wherein said means for driving said motor has a means for switching receiving said direction signal from said means for generating a velocity profile, said means for switching alternately activating two driver circuits for periodically changing the direction of rotation of said motor, said direction signal causing said means for switching to reverse said motor when said velocity profile signal is substantially zero.

7. The motor control circuit according to claim 2, wherein said pulse signal has a pulse having a predetermined time width which is greater than any time difference between a zero crossing of the voltage of the ac source and a zero crossing of the current in said motor.

8. The motor control circuit according to claim 2, wherein said zero crossing signal is substantially a ramp wave signal, each ramp thereof beginning at substantially a zero crossing of the voltage of the ac source.

9. The motor control circuit according to claim 2, wherein said zero crossing signal is a ramp wave signal, each ramp thereof beginning at substantially a zero crossing of the voltage of said ac source and wherein said means for controlling comprises:
    means for comparing said error signal to each of said ramps of said ramp wave signal and producing an output signal when a level of said ramp signal is greater than said error signal; and
    means for forming said pulse signal of a predetermined width when a leading edge of said output signal is received.

10. The motor control circuit according to claim 2, wherein said means for controlling provides said direction signal having a predetermined time period to said means for driving and wherein said velocity profile has a predetermined time period substantially equal to said time period of said direction signal.

11. The motor control circuit according to claim 2, including second means for producing a second signal indicative of the zero crossing of the voltagE of the ac line source and said means for providing said pulse signal also receiving said second signal.

12. The motor control according to claim 2, wherein said first means comprises means for determining a substantially instantaneous speed of said motor and outputting a tach signal indicative thereof, means for generating a dc voltage having a voltage level representative of said tach signal, and means for comparing said velocity profile to said dc voltage to produce an error signal.

13. The motor control circuit according to claim 11, wherein said second means comprises means for detecting a zero voltage crossing of the ac source and outputting a zero crossing signal indicative thereof.

14. The motor control circuit according to claim 2, wherein said motor first and second windings and said means for driving selectively connects the ac source to one of said first and second windings as a run winding and to the other of said first and second windings as an auxiliary winding in response to a direction signal, said means for driving connecting the ac source to said first and second windings at a first time after a zero crossing of the voltage of the ac source and then disconnecting the ac source from said first and second windings at a next zero crossing of ac current in the motor.

15. A method of operating a permanent split capacitor motor from an ac line source, comprising, the steps of:
driving said motor from the ac source by receiving a pulse signal at a predetermined time after a zero crossing of the voltage of the ac source, connecting the ac source to said motor at said predetermined time and then disconnecting the ac source from said motor at a next zero crossing of the current in said motor;
detecting a zero voltage crossing of the ac source and providing a zero crossing signal indicative thereof;
determining a substantially instantaneous speed of said motor and providing a tach signal indicative thereof;
generating a dc voltage having a voltage level representative of said tach signal;
generating a velocity profile signal by generating a square wave signal and converting said square wave signal to said velocity profile;
comparing said velocity profile signal to said dc voltage to produce an error signal;
producing said pulse signal from said error signal and said zero crossing signal;
generating a square wave signal having a predetermined time period;
generating a triangular wave signal from said square wave signal;
clipping said triangular wave signal to produce a trapezoidal wave signal; and
adjusting a dc offset of said trapezoidal signal to produce said velocity profile having said predetermined time period.

16. The method according to claim 15, wherein said predetermined time period of said square wave is substantially longer than the time period of the ac source.

17. The method according to claim 15, wherein a pulse signal is produced for every half cycle of the ac source.

18. The method according to claim 15, wherein said velocity profile has a predetermined time period and wherein said method further comprises:
producing a direction signal to drive said motor in one direction during a first time period of said velocity profile and in an opposite direction during a next second time period of said velocity profile.

19. The method according to claim 18, wherein said velocity profile has a value of substantially zero at a time point between said first and second time periods of said velocity profile so that said motor is substantially stopped when said direction signal causes said motor to reverse.

20. The method according to claim 15, wherein said pulse signal has a pulse having a predetermined time width which is greater than any time difference between a zero crossing of the voltage of the ac source and a zero crossing of the current in said motor.

21. The control circuit according to claim 15, wherein said zero crossing signal is substantially a ramp wave signal, each ramp thereof beginning at substantially a zero crossing of the voltage of said ac source.

22. The motor control circuit for operating a permanent split capacitor motor from an ac source, comprising
means for driving said motor from the ac source, said means for driving receiving a pulse signal at a predetermined time after a zero crossing of the voltage of the ac source, said means for driving connecting the ac source to said motor as said predetermined time and then disconnecting the ac source from said motor at a next zero crossing of ac current in said motor;
first means for providing a first signal indicative of the speed of said motor;
means for generating a velocity profile;
means for providing said pulse signal receiving said first signal and said velocity profile signal to produce said pusle signal therefrom every half cycle of the ac source;
means for generating said square wave signal having a predetermined time period;
means for generating a triangular wave signal from said square wave signal;
means for clipping said triangular wave signal to produce a trapezoidal wave signal; and
means for adjusting a dc offset of said trapezoidal signal to produce said velocity profile having said predetermined time period.

23. The motor control circuit according to claim 22, wherein said predetermined time period of said square wave is substantially longer than a time period of the ac source.

24. The motor control circuit according to claim 22, wherein said velocity profile has a predetermined time period and said means for driving is reversible to drive said motor in one direction during a first time period of said velocity profile and in an opposite direction during a next second time period of said velocity profile, said means for driving receiving a direction signal for reversing said motor from said means for generating a velocity profile.

25. A method of operating a permanent split capacitor motor from an ac source, comprising the steps of:

driving said motor from the ac source by receiving a pulse signal at a predetermined time after a zero crossing of the voltage of the ac source, connecting the ac source to said motor at said predetermined time and then disconnecting the ac source from said motor at a next zero crossing of the current in said motor;

detecting a zero voltage crossing of the ac source and providing a zero crossing signal indicative thereof;

determining a substantially instantaneous speed of said motor and providing a tach signal indicative thereof;

generating a dc voltage having a voltage level representative of said tach signal;

generating a velocity profile;

comparing said velocity to said dc voltage to produce an error signal;

producing said pulse signal from said error signal and said zero crossing signal every half cycle of the ac source;

generating a square wave signal having a predetermined time period;

generating a triangular wave signal from said square wave signal;

clipping said triangular wave signal to produce a trapezoidal wave signal; and adjusting a dc offset of said trapezoidal signal to produce said velocity profile having said predetermined time period.

* * * * *